United States Patent [19]

Ishida et al.

[11] Patent Number: 4,652,512

[45] Date of Patent: Mar. 24, 1987

[54] HEAT AND LIGHT-SENSITIVE RECORDING MATERIALS WITH DIALONIUM COMPOUND, COUPLER, AND HEAT FUSIBLE AMIDINE OR DIAMIDINE COMPOUND

[75] Inventors: Katsuhiko Ishida, Takatsuki; Masaharu Nojima, Amagasaki; Tosaku Okamoto, Osaka, all of Japan

[73] Assignee: Kanzaki Paper Manufacturing Company, Limited, Tokyo, Japan

[21] Appl. No.: 823,561

[22] Filed: Jan. 29, 1986

Related U.S. Application Data

[63] Continuation-in-part of Ser. No. 695,025, Jan. 25, 1985, abandoned.

[30] Foreign Application Priority Data

Feb. 7, 1984 [JP] Japan .................................. 59-20967
Aug. 24, 1984 [JP] Japan .................................. 59-177244

[51] Int. Cl.[4] .......................... G03C 1/60; G01D 9/00

[52] U.S. Cl. .................................... 430/179; 430/151; 430/176; 430/180; 430/182; 430/346; 430/348; 346/209; 346/218; 346/219

[58] Field of Search ............... 430/179, 151, 346, 348, 430/176, 138; 346/218, 209, 219

[56] References Cited

U.S. PATENT DOCUMENTS

| | | | |
|---|---|---|---|
| 3,389,995 | 6/1968 | Tripp et al. | 430/151 |
| 4,400,456 | 8/1983 | Matsuda et al. | 430/179 |
| 4,487,826 | 12/1984 | Watanabe et al. | 430/151 |
| 4,529,681 | 7/1985 | Usami et al. | 430/179 |

FOREIGN PATENT DOCUMENTS

| | | | |
|---|---|---|---|
| 1128762 | 10/1968 | United Kingdom | 430/151 |

*Primary Examiner*—Charles L. Bowers, Jr.
*Attorney, Agent, or Firm*—Armstrong, Nikaido, Marmelstein & Kubovcik

[57] ABSTRACT

This invention provides a heat-sensitive recording material comprising a substrate and a heat-sensitive recording layer which is formed over the substrate and which contains a diazonium salt, a coupler and at least one of specific heat-fusible basic amidine and diamidine compounds in which the nitrogen atom(s) of

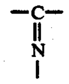

moiety(moieties) has(have) a substituent and the nitrogen atom(s) or

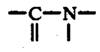

moiety(moieties) has(have) at least one substituent, the substituent being independently selected from the group consisting of phenyl, naphthyl, phenyl-$C_1$–$C_4$ alkyl and naphthyl-$C_1$–$C_4$ alkyl, each optionally substituted with $C_1$–$C_4$ alkyl, $C_1$–$C_4$ alkoxy, phenyloxy, nitro or halogen, and in which amidine compounds are other than formamidines. The heat-sensitive recording material is especially excellent in storage stability.

9 Claims, No Drawings

HEAT AND LIGHT-SENSITIVE RECORDING MATERIALS WITH DIALONIUM COMPOUND, COUPLER, AND HEAT FUSIBLE AMIDINE OR DIAMIDINE COMPOUND

CROSS-REFERENCE TO RELATED APPLICATION

This application is a continuation-in-part application of our earlier copending patent application Ser. No. 695,025, filed Jan. 25, 1985, now abandoned.

BACKGROUND OF THE INVENTION

1. Field of the Invention

This invention relates to heat-sensitive recording materials and more particularly to fixable heat-sensitive recording materials of the diazo type.

2. Description of the Prior Art

Heat-sensitive recording materials are well known which are adapted to produce record images by thermally contacting a colorless basic dye with a color developing material to utilize color-forming reaction occurring on contact of the color developing material with the dye.

These conventional heat-sensitive recording materials are designed to produce record images by being heated and therefore have the following drawback. Even after record images have been formed by application of heat, color-forming reaction still takes place when they are inadvertently heated. As a result, the record images will become obscure or illegible owing to the coloration of the background portion thus heated. For this reason, the heat-sensitive recording materials of this type are unfit for use in recording important information to be stored.

In recent years, research is under way to develop fixable heat-sensitive recording materials of the diazo type utilizing color-forming reaction between a diazonium salt and a coupler.

Generally heat-sensitive recording materials of the diazo type include a recording layer formed on a substrate and having dispersed therein particles of a diazonium salt, a coupler and a color developing auxiliary capable of producing a base by being heated. On heating the recording layer of this type of heat-sensitive recording material, the color developing auxiliary produces a base which causes color-forming reaction (diazo coupling reaction) of the diazonium salt with the coupler to give record images. Thereafter the entire surface of the recording layer is irradiated with ultraviolet rays to decompose the unreacted diazonium salt in the unrecorded portion of the recording layer. The decomposition of the unreacted diazonium salt eliminates the possibility of color-forming reaction occurring on application of heat, whereby the record images are fixed.

Known color developing auxiliaries capable of producing a base when heated include substances producing a base on thermal decomposition such as organic or inorganic ammonium salts, urea and the like. However, since these substances gradually decompose even at ambient temperature, diazo coupling reaction between the diazonium salt and the coupler is caused during the storage of the recording material (this reaction will be hereinafter referred to as "precoupling"), thereby giving rise to undesired coloration (fogging) of the recording layer.

It has been also proposed to use, as such color developing auxiliary, a substance capable of producing a basic atmosphere by being thermally fused, such as guanidine derivatives and aliphatic amines, e.g., stearyl amine. The use of these substances, however, results also in occurence of precoupling during storage especially under humid conditions and consequently in coloration (fogging) of the recording layer.

British Patent No. 1,128,762 also discloses various heat sensitive organic bases, which include amidines, in particular, N,N'-diphenylformamidine and benzamidines in which one of the two nitrogen atoms may optionally have a substituent selected from the group consisting of benzyl, cyclohexyl, phenyl and 2-pyridyl, such as benzamidine, p-toluylamidine, N-benzylanisamidine, N-cyclohexylanisamidine, N-phenylbenzamidine, N-(2-pyridyl)benzamidine and the like and N-phenylacetamidine. According to our investigation, however, when N,N'-diphenylformamidine and similar formamidines are used, the resulting recording materials have a relatively good storage stability, but when stored for a prolonged period of time, e.g. for about 6 months, under normal condition, the recording materials give rise to a marked fogging due to the precoupling and emit strong disagreeable amine-like odor. Similarly the use of the foregoing benzamidines or N-phenylacetamidine also results in precoupling and often causes strong amine-like odor to be emitted during storage for a prolonged period of time, e.g. for about 6 months, under normal condition.

U.S. Patent No. 3,389,995 discloses as the heat-sensitive color developing auxiliary an amidine compound of the formula

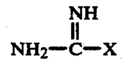

wherein X is methyl, ethyl, propyl and the like.

According to our investigation, these amidines were also found to cause precoupling or emission of disagreeable amine-like odor when the recording material is stored for a long time, e.g., for about 6 months, under normal condition.

SUMMARY OF THE INVENTION

It is an object of the present invenion to provide heat-sensitive recording materials of the diazo type which can exhibit excellent storage stability without causing precoupling over a prolonged period of time, e.g. for about 6 months under normal condition and for about one week under humid conditions.

It is another object of the present invention to provide heat-sensitive recording materials of the diazo type which will not emit disagreeable odor even when stored for a prolonged period of time, e.g. for about 6 months.

It is another object of the present invenion to provide heat-sensitive recording materials of the diazo type which have a sensitivity sufficient to form sharp color images and which can form record images of satisfactory color density.

These objects and other features of the present invention will become apparent from the following description.

The present invention provides a heat-sensitive recording material comprising a substrate and a heat-sensitive recording layer which is formed over the substrate either by applying a coating composition comprising a diazonium salt, a coupler and a heat-fusible basic compound to the substrate in one layer or by applying a coating composition comprising one or two members of a diazonium salt, a coupler and a heat-fusible basic compound and a coating composition comprising the rest thereof to the substrate in superposed layers, wherein the diazonium salt and coupler are chosen from those diazonium salts and couplers which are capable of reacting together in a basic medium to form an azo dye and are present in the heat-sensitive recording layer in amounts effective for reacting together to form a colored image: the diazonium salt is decomposable when irradiated with ultraviolet radiation and the heat-fusible basic compound is present in the heat-sensitive recording layer in an amount effective for supplying a sufficient amount of base for causing the diazonium salt to react with the coupler to provide the azo dye, characterized in that the heat-fusible basic compound is at least one member selected from the group consiting of amidine and diamidine compounds of the formula

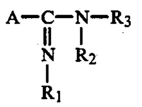
(I)

wherein:

$R_1$ and $R_2$ are the same or different and are each phenyl, naphthyl, phenyl-$C_1$-$C_4$ alkyl or naphthyl-$C_1$-$C_4$ alkyl, each optionally substituted with $C_1$-$C_4$ alkyl, $C_1$-$C_4$ alkoxy, phenyloxy, nitro or halogen, $R_3$ is hydrogen, $C_5$-$C_6$ cycloalkyl, phenyl, naphthyl, phenyl-$C_1$-$C_4$ alkyl, naphthyl-$C_1$-$C_4$ alkyl or $C_1$-$C_{18}$ alkyl, said phenyl, naphthyl, phenyl-$C_1$-$C_4$ alkyl and naphthyl-$C_1$-$C_4$ alkyl being optionally substituted with $C_1$-$C_4$ alkyl, $C_1$-$C_4$ alkoxy, phenyloxy, nitro or halogen and said $C_1$-$C_{18}$ alkyl being optionally substituted with $C_1$-$C_4$ alkoxy, phenyloxy or halogen, and A is $R_4$ or a group of the formula

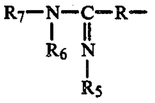

wherein:

$R_4$ is $C_5$-$C_6$ cycloalkyl, phenyl, naphthyl, phenyl-$C_1$-$C_4$ alkyl, naphthyl-$C_1$-$C_4$ alkyl or $C_1$-$C_{18}$ alkyl, said phenyl, naphthyl, phenyl-$C_1$-$C_4$ alkyl and naphthyl-$C_1$-$C_4$ alkyl being optionally substituted with $C_1$-$C_4$ alkyl, $C_1$-$C_4$ alkoxy, phenyloxy, nitro or halogen and said $C_1$-$C_{18}$ alkyl being optionally substituted with $C_1$-$C_4$ alkoxy, phenyloxy or halogen, $R_5$ and $R_6$ have the same meaning as $R_1$ or $R_2$, $R_7$ has the same meaning as $R_3$, and R is alkylene, phenylene, naphthylene or a group of the formula

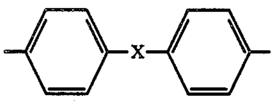

wherein X is alkylene, $SO_2$, S, O, NH or a single bond.

We conducted extensive research in an attempt to find heat-fusible basic compounds which can be advantageously used as the color developing auxiliary in the fixable heat-sensitive recording materials of the diazo type and which can impart outstanding storage stability to the recording materials. According to our investigation, the foregoing specific class of amidine or diamidine compounds which are not disclosed in the foregoing prior art were found to give extremely high storage stability to the recoding material. The specific amidine or diamidine compounds have the structural characteristics that all of the nitrogen atoms of the

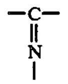

moiety or moieties and

moiety or moieties have the substituents $R_1$ and $R_2$ or $R_1$, $R_2$, $R_5$ and $R_6$ which represent the foregoing optionally substituted phenyl, naphthyl, phenyl-$C_1$-$C_4$ alkyl or naphthyl-$C_1$-$C_4$ alkyl group and that the carbon atom of the

moiety has a substituent A (=$R_4$) which is not a hydrogen atom (i.e. the specific amidine compounds do not fall within a class of formamidine derivatives).

By the use of at least one of the foregoing heat-fusible basic compounds of the formula (I) serving as a color developing auxiliary, the heat-sensitive recording materials of the present invention can exhibit outstanding storage stability over a prolonged period of about 6 months or more under normal condition, and over a period of about one week or more under humid conditions. The recording materials of the invention do not emit disagreeable amine-like odor during storage for a long time. The heat-sensitive recording materials of the invention have a further advantage of being free from undesired coloration of the recording layer which would otherwise take place immediately after production of the recording material. Moreover, the heat-sensitive recording materials of the invention can form color of high density with satisfactory sensitivity and therefore can produce sharp record images.

DETAILED DESCRIPTION OF THE INVENTION

It is essential in the present invention to use at least one of the heat-fusible basic compounds represented by the formula (I). A class of the compounds of the formula (I) are amidine compounds represented by the formula

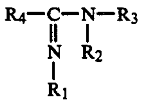
(Ia)

wherein $R_1$, $R_2$, $R_3$ and $R_4$ are as defined above. The compounds of the formula (I) also include diamidine compounds represented by the formula

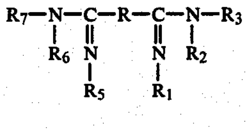
(Ib)

wherein $R_1$, $R_2$, $R_3$, $R_5$, $R_6$, $R_7$ and R are as defined above.

Of the groups represented by $R_1$ to $R_7$ in the compounds of the formula (I), preferred $C_5$–$C_6$ cycloalkyl groups are cyclopentyl and cyclohexyl; preferred phenyl-$C_1$–$C_4$ alkyl groups are benzyl, phenylethyl, phenylpropyl and phenylbutyl, and preferred naphthyl-$C_1$–$C_4$ alkyl groups are naphthylmethyl, naphthylethyl, naphthylpropyl and naphthylbutyl; and preferred $C_1$–$C_{18}$ alkyl groups are methyl, ethyl, propyl, isopropyl, butyl, isobutyl, t-butyl, pentyl, hexyl, heptyl, octyl, nonyl, decyl, dodecyl, tridecyl, tetradecyl, pentadecyl, heptadecyl and octadecyl. With respect to the substituents which phenyl, naphthyl, phenyl-$C_1$–$C_4$ alkyl, naphthyl-$C_1$–$C_4$ alkyl or $C_1$–$C_{18}$ alkyl groups may have, examples of $C_1$–$C_4$ alkyl are methyl, ethyl, propyl, isopropyl and butyl; examples of $C_1$–$C_4$ alkoxy are methoxy, ethoxy, propoxy, isopropoxy, butoxy, isobutoxy and t-butoxy; examples of halogen are fluorine, chlorine and bromine. Preferable examples of the alkylene groups represented by R in the formula (I) are branched-chain or straight-chain $C_1$–$C_{18}$ alkylene groups such as methylene, dimethylene, trimethylene, hexamethylene, decamethylene, dodecamethylene, octadecamethylene, 2-methyl-1,3-trimethylene, 2-ethyl-1,4-tetramethylene, 2-methyl-1,12-dodecamethylene and the like. Suitable alkylene groups represented by X in the group

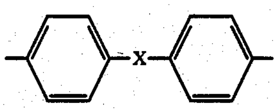

represented by R in the formula (I) are $C_1$–$C_{18}$ alkylene groups such as those exemplified above. Preferred groups represented by R are $C_1$–$C_{18}$ alkylene and phenylene.

Of the compounds of the formula (I) having the preferable groups exemplified above, more preferable of the compounds of the formula (Ia) are amidine compounds wherein $R_1$ and $R_2$ are phenyl groups optionally substituted with $C_1$–$C_4$ alkyl, $C_1$–$C_4$ alkoxy, nitro or halogen, $R_3$ is hydrogen and $R_4$ is phenyl, naphthyl, phenyl-$C_1$–$C_4$ alkyl, naphthyl-$C_1$–$C_4$ alkyl or $C_1$–$C_{18}$ alkyl, said phenyl, naphthyl, phenyl-$C_1$–$C_4$ alkyl and naphthyl-$C_1$–$C_4$ alkyl being optionally substituted with $C_1$–$C_4$ alkyl, $C_1$–$C_4$ alkoxy, nitro or halogen on the aromatic ring and said $C_1$–$C_{18}$ alkyl being optionally substituted with $C_1$–$C_4$ alkoxy, phenyloxy or halogen. More preferable of the compounds of the formula (Ib) are diamidine compounds wherein $R_1$, $R_2$, $R_5$ and $R_6$ are phenyl groups optionally substituted with $C_1$–$C_4$ alkyl, $C_1$–$C_4$ alkoxy, nitro or halogen, $R_3$ and $R_7$ are each hydrogen and R is $C_1$–$C_{18}$ alkylene. These more preferable compounds give heat-sensitive recording materials especially outstanding in storage stability.

The amidine compounds and diamidine compounds of the formula (I) can be synthesized by conventional processes, e.g., process disclosed by N. S. Drozdov and A. F. Bekhli, J. Gen. Chem. (U.S.S.R.), 14 (1944) 472–479 and A. C. Hontz, E. C. Wagner, Org. Synth., IV, 383 (1963) or a similar process.

Given below are specific examples of the heat-fusible basic compounds of the formula (I) used in the present invention to which, however, useful compounds are not limited:

N,N'-diphenylacetamidine (m.p. 133° C.),
N,N'-diphenyl-2-phenoxyacetamidine (m.p. 192° C.),
N-(o-nitrophenyl)-N'-phenylacetamidine (m.p. 108° C.),
N-(m-nitrophenyl)-N'-phenylacetamidine (m.p. 118° C.),
N-o-tolyl-N'-p-tolylacetamidine (m.p. 143° C.),
N,N'-bis(p-bromophenyl)acetamidine (m.p. 129° C.),
N,N'-diphenylbenzamidine (m.p. 147° C.),
N,N',N'-triphenylbenzamidine (m.p. 170° C.),
N,N'-diphenyl-p-chlorobenzamidine (m.p. 148° C.),
N,N'-diphenyl-N'-methyl-o-nitro-benzamidine (m.p. 141° C.),
N-phenyl-N'-ethyl-N'-(o-chlorophenyl)benzamidine (m.p. 123° C.),
N,N'-diphenyl-N'-(o-chlorophenyl)benzamidine (m.p. 171° C.),
N,N'-bis(o-chlorophenyl)-N'-phenylbenzamidine (m.p. 142° C.),
N,N'-diphenyl-N'-(p-chlorophenyl)benzamidine (m.p. 150° C.),
N,N'-bis(p-chlorophenyl)benzamidine (m.p. 143° C.),
N,N'-bis(p-chlorophenyl)-N'-methylbenzamidine (m.p. 153° C.),
N,N'-bis(p-chlorophenyl)-N'-phenylbenzamidine (m.p. 132° C.),
N,N',N'-tris(p-chlorophenyl)benzamidine (m.p. 147° C.),
N,N'-bis(m-nitrophenyl)benzamidine (m.p. 147° C.),
N-(p-nitrophenyl)-N'-(p-chlorophenyl)benzamidine (m.p. 174° C.),
N-(p-chlorophenyl)-N'-p-tolylbenzamidine (m.p. 134° C.),
N-(p-nitrophenyl)-N'-p-tolylbenzamidine (m.p. 159° C.),
N-phenyl-N',N'-di-p-tolylbenzamidine (m.p. 149° C.),
N,N'-di-p-tolylbenzamidine (m.p. 132° C.),
N,N'-di-p-tolyl-N'-phenylbenzamidine (m.p. 133° C.),
N,N'-diphenylbutyramidine (m.p. 104° C.),
N,N'-diphenylpalmitamidine (m.p. 86° C.),
N,N'-diphenyl-p-anisamidine (m.p. 134° C.),
N,N'-diphenyl-3-phenylpropionamidine (m.p. 109° C.),
N,N'-diphenyl-2-(1-naphthyl)acetamidine (m.p. 132° C.),
N,N'-diphenyl-p-toluamidine (m.p. 170° C.),
N,N'-bis(m-ethylphenyl)benzamidine,
N,N'-bis(p-n-propylphenyl)benzamidine,
N,N'-bis(p-methoxyphenyl)benzamidine,
N,N'-bis(p-ethoxyphenyl)benzamidine,
N,N'-diphenyl-p-nitrobenzamidine,
N,N'-diphenyl-β-naphthamidine,
N,N'-diphenyl-2-(p-chlorophenyl)acetamidine,
N,N'-diphenyl-3-methoxypropionamidine,
N,N',N'',N'''-tetraphenyl-terephthalamidine (m.p. 233° C.),
N,N',N'',N'''-tetraphenyl-hexanediamidine (m.p. 131° C.),
N,N',N'',N'''-tetraphenyl-heptanediamidine (m.p. 141° C.),
N,N',N'',N'''-tetraphenyl-decanediamidine (m.p. 143° C.), N,N',N'',N'''-tetraphenyldodecanediamidine (m.p. 164° C.),
N,N',N'',N'''-tetrakis(p-tolyl)decanediamidine (m.p. 148° C.),
N,N',N'',N'''-tetrakis(p-chlorophenyl)octadecanediamidine,
N,N',N'',N'''-tetrakis(p-methoxyphenyl)octadecanediamidine,
N,N',N'',N'''-tetrakis(p-nitrophenyl)octadecanediamidine,
p,p'-sulfonylbis(N,N'-diphenylbenzamidine), and
p,p'-thiobis(N,N'-diphenylbenzamidine).

The heat-fusible basic compounds of the formula (I) can be singly used or at least two of them are usable in admixture. The compound of the formula (I) is used in an amount effective for supplying a sufficient amount of a base on fusion for causing the diazonium salt to react with the coupler to form an azo dye. The amount of the compound of the formula (I) used can be suitably decided depending on the selection of the compounds (I), the kinds and amounts of the diazonium salt and coupler, etc. but generally ranges preferably from about 1 to about 30 parts by weight, more preferably about 1 to about 15 parts by weight, per part by weight of the diazonium salt.

The diazonium salts which can be used in the present invention are those capable of producing an azo dye by reacting with the coupler in a basic atmosphere and include a wide range of those conventionally used in the art. Examples of useful diazonium salts are tetraphenylborate, tetrafluoroborate, hexafluorophosphate and hexafluoroantimonate of p-N,N-dimethylaminobenzenediazonium, p-N,N-diethylaminobenzenediazonium, 4-morpholino-2,5-dibutoxybenzenediazonium, 4-(4-methoxy)benzoylamino-2,5-diethoxybenzenediazonium, 4-morpholinobenzenediazonium, 4-pyrrolidino-3-methylbenzenediazonium, p-N-ethyl-N-hydroxyethylanilinediazonium, 4-benzamide-2,5-diethoxybenzenediazonium, 2-N,N-diethyl-m-toluidinediazonium, 6-morpholino-m-toluidinediazonium and the like, and double salts of chlorides of these diazonium cations and zinc chloride, etc. These diazonium salts can be singly used or at least two of them are usable in admixture.

The kinds of the coupler used are not limited so far as the coupler can produce an azo dye by coupling with the diazonium salt. Useful couplers include a wide variety of those conventionally used in the art. Specific examples of couplers are resorcinol, catechol, phloroglucin, $\alpha$-naphtol, 1,5-di-hydroxynaphthalene, 2,5-dimethyl-4-morpholinomethylphenol, sodium 1-hydroxynaphthalene-4-sulfonate, N-(3-morpholinopropyl)-3-hydroxy-2-naphthamide, 2-hydroxy-3-($\beta$-hydroxyethylamidocarbonyl)naphthalene, 2-hydroxynaphthalene-3-carbonyldiethanolamine, disodium 2-hydroxynaphthalene-3,6-disulfonate, acetoacetanilide, 3-methyl-5-pyrazolone, 1-phenyl-3-methyl-5-pyrazolone, 1-hydroxy-2-naphthoic acid anilide, N-($\beta$-naphthyl)-2-hydroxy-3-naphthamide, N-(2-hydroxyethyl)-2-hydroxy-3-naphthamide, 2-hydroxy-3-naphthoic acid anilide, 2-hydroxy-3-naphthoic acid m-nitroanilide, 2-hydroxy-3-naphthoic acid p-chloroanilide, 2-hydroxy-3-naphthoic acid o-ethoxyanilide, 2-hydroxy-3-naphthoic acid 2,5-dimethoxyanilide, 4,4'-di-o-acetoacetotoluidide, etc. The use of at least one of these compounds enables formation of record images having the desired color.

The proportions of the diazonium salt and the coupler used in the present invention can be adequately decided depending on their kinds. Generally about 0.1 to about 10 parts by weight of the coupler is used per part by weight of the diazonium salt.

According to the present invention, the substrate is coated with a heat-sensitive recording layer containing at least one species each of the diazonium salts, couplers and the specific heat-fusible basic compounds exemplified above. To form the recording layer, a coating composition comprising these components is prepared and applied to the substrate in one layer. Alternatively, one or two of these components and the rest thereof are each made into coating compositions, and the coating compositions are applied to the substrate in superposed layers, thereby providing the desired recording layer. In formulating the coating composition, the diazonium salt, coupler and heat-fusible basic compound of the formula (I) are dispersed in water separately or at the same time. These components may also be separately or conjointly dispersed or dissolved in an organic solvent to prepare a coating composition, so far as color-forming reaction is not caused during preparation and application of the coating composition. The dispersing operation is performed with use of a stirring or pulverizing device such as a ball mill, attritor, sand mill and the like. Examples of the organic solvent are ethanol, benzene, toluene, n-hexane, ethyl acetate, etc.

The coating composition generally includes as a binder a water-soluble or water-insoluble adhesive such as starches, casein, gum arabic, polyvinyl alcohol, polyvinyl acetate emulsion, SBR latex, polystyrene, polyvinyl chloride, polyvinyl acetate, vinyl chloride/vinyl acetate copolymer and the like in an amount of about 5 to about 30% by weight, preferably about 10 to about 25% by weight, based on the total weight of the solids in the recording layer.

When required, additives can be incorporated in the coating composition. Examples of suitable additives are a preservability-improving agent such as sodium naphthalenesulfonate, disodium naphthalenedisulfonate, sulfosalicylic acid, magnesium sulfate and zinc chloride; an antioxidant such as thiourea and diphenylthiourea; a stabilizer such as citric acid, malic acid, tartaric acid, phosphoric acid and saponin; a pigment such as silica, clay, barium sulfate, titanium oxide and calcium carbonate; an agent for reducing the melting temperature of the recording layer such as animal or vegetable wax, petroleum wax, polyhydric alcohol esters of higher fatty acids, higher fatty acid amides, tertiary aromatic amines, condensation products of higher fatty acids and amines, synthetic paraffin, chlorinated paraffin, alkyl or aryl esters of naphthoic acids; etc.

The coating composition thus prepared is applied to a substrate of paper, plastics film, synthetic paper, metal film or the like. The coating methods which can be employed in this invention are not particularly limited and include those conventionally practiced using a coating device such as an air knife coater, roll coater, blade coater and short-dwell coater. The coating composition is applied in an amount of about 3 to about 10 $g/m^2$ based on the dry weight and the coating is dried.

The heat-sensitive recording materials of the present invention thus prepared can exhibit outstanding storage stability over a prolonged period of time free of precoupling during storage which would occur in conventional heat-sensitive recording materials of the diazo type.

In the same manner as with the conventional heat-sensitive recording materials, record images are produced on the heat-sensitive recording material of the invention with a thermal pen or a thermal head. Then the entire surface of the recording layer is irradiated with ultraviolet rays using a fluorescent lamp or mercury lamp to decompose the unreacted diazonium salt in the unrecorded portion of the recording layer, whereby the record images are fixed.

The present invention will be described below in more detail with reference to the following Examples and Comparison Examples in which the parts and percentages are all by weight unless otherwise specified.

EXAMPLE 1

(1) Preparation of mixture A

| | |
|---|---|
| p-N,N—Diethylaminobenzenediazonium tetraphenylborate | 2 parts |
| Calcium carbonate | 50 parts |
| 10% Aqueous solution of polyvinyl alcohol | 50 parts |
| Water | 100 parts |

The above components were dispersed by a ball mill for 48 hours to prepare a mixture A.

(2) Preparation of mixture B

| | |
|---|---|
| 2 Hydroxy-3-naphthoic acid o-ethoxyanilide | 25 parts |
| N,N'—Diphenylbenzamidine | 25 parts |
| 20% Aqueous dispersion of stearic acid amide | 40 parts |
| 10% Aqueous solution of polyvinyl alcohol | 50 parts |

The above components were dispersed by a ball mill for 48 hours to prepare a mixture B.

The mixture B thus obtained was applied by a Mayer bar to wood-free paper weighing 49 $g/m^2$ in an amount of 4 $g/m^2$ based on dry weight and the coated paper was dried. The mixture A was applied in the same manner to the coating in an amount of 4 $g/m^2$ based on dry weight and the paper thus coated was dried to produce a heat-sensitive recording material.

EXAMPLE 2

(1) Preparation of mixture A

| | |
|---|---|
| 4-Morpholino-2,5-dibutoxybenzene-diazonium hexafluorophosphate | 2 parts |
| Titanium oxide | 50 parts |
| 10% Aqueous solution of polyvinyl alcohol | 50 parts |
| Water | 100 parts |

The above components were dispersed by a ball mill for 48 hours to prepare a mixture A.

(2) Preparation of mixture B

| | |
|---|---|
| 2-Hydroxy-3-naphthoic acid anilide | 25 parts |
| N,N',N'—Triphenylbenzamidine | 25 parts |
| 20% Aqueous dispersion of stearic acid amide | 40 parts |
| 10% Aqueous solution of polyvinyl alcohol | 50 parts |

The above components were dispersed by a ball mill for 48 hours to prepare a mixture B.

A heat-sensitive recording material was prepared by repeating the same procedure as in Example 1 except that the mixtures A and B thus prepared were used.

EXAMPLE 3

(1) Preparation of mixture A

| | |
|---|---|
| p-N,N—Diethylaminobenzenediazonium tetrafluoroborate | 2 parts |
| Thiourea | 2 parts |
| Tartaric acid | 2 parts |
| 10% Toluene solution of vinyl chloride/vinyl acetate copolymer | 50 parts |
| Finely divided silica | 25 parts |
| Toluene | 50 parts |

The above components were dispersed by a ball mill for 48 hours to prepare a mixture A.

(2) Preparation of mixture B

A mixture B was prepared in the same manner as in Example 1.

The mixture A thus obtained was applied by a Mayer bar to wood-free paper weighing 49 $g/m^2$ in an amount of 3 $g/m^2$ based on dry weight and the coated paper was dried. The mixture B was applied in the same manner to the coating in an amount of 4 $g/m^2$ based on dry weight and the paper thus coated was dried to produce a heat-sensitive recording material.

EXAMPLES 4 TO 6

Three kinds of heat-sensitive recording materials were prepared in the same manner as in Example 1 except that the following compounds were used in place of the N,N'-diphenylbenzamidine employed for preparing the mixture B.

| Example No. | Compound used |
|---|---|
| 4 | N,N'—diphenyl-2-phenoxy-acetamidine |
| 5 | N,N'—diphenyl-p-anisamidine |
| 6 | N,N'—diphenyl-3-phenylpropionamidine |

EXAMPLE 7

(1) Preparation of mixture A

| | |
|---|---|
| 4-(4-Methoxy)-benzoylamino-2,5-diethoxy-benzenediazonium tetrafluoroborate | 2 parts |
| Finely divided silica | 25 parts |
| Barium sulfate | 25 parts |
| Citric acid | 2 parts |
| 10% Aqueous solution of polyvinyl alcohol | 50 parts |
| Water | 100 parts |

The above components were dispersed by a ball mill for 48 hours to prepare a mixture A.

(2) Preparation of mixture B

| | |
|---|---|
| 2-Hydroxynaphthalene-3-carbonyl-diethanolamine | 25 parts |
| N—(o-nitrophenyl)-N'—phenylacetamidine | 25 parts |
| Tribenzylamine | 10 parts |
| Diphenylthiourea | 2 parts |
| 10% Aqueous solution of polyvinyl alcohol | 50 parts |
| Water | 50 parts |

The above components were dispersed by a ball mill for 48 hours to prepare a mixture B.

A heat-sensitive recording material was prepared by repeating the same procedure as in Example 1 except that the mixture A and B thus prepared were used.

EXAMPLE 8

A heat-sensitive recording material was prepared in the same manner as in Example 7 except that N,N'-diphenylbutyramidine was used in place of the N-(o-nitrophenyl)-N'-phenylacetamidine employed for preparing the mixture B.

EXAMPLE 9

A dispersion C was prepared using a mixture A produced in the same manner as in Example 1 and a mixture B produced by using N,N'-bis(p-chlorophenyl) benzamidine in place of the N,N'-diphenylbenzamidine employed in Example 1 in a mixture A/mixture B ratio of 3:1. The dispersion C was applied by a Mayer bar to wood-free paper weighing 49 g/m$^2$ in an amount of 7 g/m$^2$ by dry weight and the coated paper was dried to produce a heat-sensitive reoording material.

EXAMPLES 10 TO 12

Three kinds of heat-sensitive recording materials were prepared in the same manner as in Example 9 except that N,N'-diphenyl-p-chlorobenzamidine (Example 10), N,N'-di-p-tolylbenzamidine (Example 11) and N,N'-diphenyl-p-toluamidine (Example 12) were used in place of the N,N'-bis(p-chlorophenyl)benzamidine employed for preparing the mixture B.

EXAMPLES 13 TO 15

Three kinds of heat-sensitive recording materials were prepared in the same manner as in Example 9 except that the following amidines were used in place of the N,N'-bis(p-chlorophenyl)benzamidine employed for preparing the mixture B.

| Example No. | Amidines used |
|---|---|
| 13 | N,N'—Diphenylbenzamidine |
| 14 | N,N'—Diphenylacetamidine |
| 15 | N,N'—Diphenylbutyramidine |

EXAMPLE 16

A heat-sensitive recording material was prepared in the same manner as in Example 1 except that N,N',N'',N'''-tetraphenyldecanediamidine was used in place of the N,N'-diphenylbenzamidine employed for preparing the mixture B.

EXAMPLE 17

A heat-sensitive recording material was prepared in the same manner as in Example 2 except that N,N',N'',N'''-tetraphenylterephthalamidine was used in place of the N,N',N'-triphenylbenzamidine employed for preparing the mixture B.

EXAMPLE 18

A heat-sensitive recording material was prepared in the same manner as in Example 3 except that a mixture B produced in the same manner as in Example 16 was used.

EXAMPLE 19

A heat-sensitive recording material was prepared in the same manner as in Example 9 except that N,N',N'',N'''-tetrakis(p-chlorophenyl)octadecanediamidine was used in place of the N,N'-bis(p-chlorophenyl)benzamidine employed for preparing the mixture B.

COMPARISON EXAMPLE 1

A heat-sensitive recording material was prepared by repeating the same procedure as in Example 1 except that stearylamine was used in place of the N,N'-diphenylbenzamidine employed in the preparation of the mixture B in Example 1.

COMPARISON EXAMPLE 2

A heat-sensitive recording material was prepared by repeating the same procedure as in Example 2 except that ammonium stearate was used in place of the N,N',N'-triphenylbenzamidine employed in the preparation of the mixture B in Example 2.

COMPARISON EXAMPLE 3

A heat-sensitive recording material was prepared in the same manner as in Example 3 except that 1,3-di-o-tolylguanidine was used in place of the N,N'-diphenylbenzamidine employed for preparing the mixture B.

COMPARISON EXAMPLE 4

A heat-sensitive recording material was prepared in the same manner as in Example 9 except that N,N'-dicyclohexyl-N''-phenylguanidine was used in place of the N,N'-bis(p-chlorophenyl)benzamidine employed for preparing the mixture B.

COMPARISON EXAMPLES 5 TO 12

Eight kinds of heat-sensitive recording materials were prepared in the same manner as in Comparison Example 4 except that the following amidines were used in place of the N,N'-dicyclohexyl-N''-phenylguanidine employed for preparing the mixture B.

| Comp. Ex. No. | Amidines used |
|---|---|
| 5 | N—o-Chlorophenyl-N'—phenylformamidine |
| 6 | N—Benzylanisamidine |
| 7 | N—Phenylbenzamidine |
| 8 | N—Phenylacetamidine |
| 9 | Benzamidine |
| 10 | p-Toluylamidine |
| 11 | N,N'—Diphenylformamidine |
| 12 | Propionamidine |

COMPARISON EXAMPLE 13

A heat-sensitive recording material was prepared in the same manner as in Example 7 except that N-(o-chlorophenyl)-N'-phenylformamidine was used in place of the N-(o-nitrophenyl)-N'-phenylacetamidine employed for preparing the mixture B.

The thirty-two kinds of heat-sensitive recording materials thus obtained were tested for the color density and storage stability. More specifically, each of the recording materials was brought into contact with a heating plate at 110° C. for 2 seconds to produce color and was exposed to ultraviolet rays to obtain a fixed record image. The color density of the record images thus formed was measured with a Macbeth densitometer (using a yellow filter). The storage stability of the heat-sensitive recording materials produced above was evaluated by measuring, with a Macbeth densitometer (using a yellow filter), the background color density (degree of fogging) of the heat-sensitive recording materials immediately after preparation thereof or after standing at 30° C. and 70% RH for 7 days or after standing at 25° C. and 60% RH for 6 months, and comparing the values of background color density thereof at the three stages. The recording materials were also checked for the amine-like odor after standing at 25° C. and 60% RH for 6 months. Table 1 below shows the results.

TABLE 1

| | Color density of record image | Background Color Density | | | Amine-like odor |
|---|---|---|---|---|---|
| | | Immediately after preparation | After 7 days | After 6 months | |
| Ex. | | | | | |
| 1 | 1.13 | 0.07 | 0.14 | 0.21 | None |
| 2 | 1.05 | 0.06 | 0.11 | 0.19 | None |
| 3 | 0.96 | 0.06 | 0.09 | 0.16 | None |
| 4 | 1.01 | 0.06 | 0.12 | 0.23 | None |
| 5 | 1.14 | 0.09 | 0.18 | 0.25 | None |
| 6 | 1.15 | 0.10 | 0.20 | 0.26 | None |
| 7 | 1.05 | 0.06 | 0.10 | 0.15 | None |
| 8 | 1.08 | 0.06 | 0.11 | 0.15 | None |
| 9 | 1.15 | 0.08 | 0.16 | 0.20 | None |
| 10 | 1.08 | 0.08 | 0.13 | 0.22 | None |
| 11 | 1.16 | 0.09 | 0.17 | 0.23 | None |
| 12 | 1.18 | 0.10 | 0.21 | 0.25 | None |
| 13 | 1.17 | 0.09 | 0.17 | 0.24 | None |
| 14 | 1.12 | 0.07 | 0.19 | 0.30 | None |
| 15 | 1.20 | 0.10 | 0.29 | 0.35 | None |
| 16 | 1.21 | 0.08 | 0.26 | 0.34 | None |
| 17 | 1.10 | 0.07 | 0.12 | 0.23 | None |
| 18 | 1.16 | 0.07 | 0.16 | 0.28 | None |
| 19 | 1.22 | 0.09 | 0.28 | 0.35 | None |
| Comp. Ex. | | | | | |
| 1 | 1.11 | 0.52 | 0.96 | 1.23 | Strong |
| 2 | 0.91 | 0.34 | 0.72 | 1.02 | Strong |
| 3 | 0.99 | 0.18 | 0.46 | 0.81 | None |
| 4 | 1.17 | 0.14 | 0.50 | 0.72 | None |
| 5 | 1.13 | 0.07 | 0.15 | 0.70 | Strong |
| 6 | 1.12 | 0.10 | 0.39 | 0.72 | None |
| 7 | 1.09 | 0.09 | 0.26 | 0.56 | None |
| 8 | 1.16 | 0.10 | 0.48 | 0.83 | None |
| 9 | 1.16 | 0.09 | 0.72 | 0.96 | Strong |
| 10 | 1.14 | 0.08 | 0.76 | 0.96 | Strong |
| 11 | 1.21 | 0.10 | 0.23 | 0.72 | Strong |
| 12 | 1.23 | 0.11 | 0.65 | 0.88 | Strong |
| 13 | 1.09 | 0.07 | 0.12 | 0.62 | Strong |

Table 1 reveals that the heat-sensitive recording materials of the present invention produced in the Examples are all outstanding in the storage stability, i.e., do not cause fogging due to the precoupling even stored for 6 months under normal condition or for 7 days under humid condition, and further are satisfactory in the color density of the record image as well as in the degree of background color density (fogging) which was very low immediately after preparation. In contrast, the heat-sensitive recording materials containing an aliphatic amine (Comparison Example 1), an ammonium salt of organic acid (Comparison Example 2), a guanidine derivative (Comparison Examples 3 and 4) or conventional amidines (Comparison Examples 6 to 12) as a color developing auxiliary are all low in the storage stability when stored for 6 months under normal condition and in many cases low in the storage stability when stored for 7 days under humid condition.

We claim:

1. A heat-sensitive recording material comprising a substrate and a heat-sensitive recording layer which is formed over the substrate either by applying a coating composition comprising a diazonium salt, a coupler and a heat-fusible basic compound to the substrate in one layer or by applying a coating composition comprising one or two members of a diazonium salt, a coupler and a heat-fusible basic compound and a coating composition comprising the rest thereof to the substrate in superposed layers, wherein the diazonium salt and coupler are chosen from those diazonium salts and couplers which are capable of reacting together in a basic medium to form an azo dye and are present in the heat-sensitive recording layer in amounts effective for reacting together to form a colored image; the diazonium salt is decomposable when irradiated with ultraviolet radiation and the heat-fusible basic compound is present in the heat-sensitive recording layer in an amount effective for supplying a sufficient amount of base for causing the diazonium salt to react with the coupler to provide the azo dye, characterized in that the heat-fusible basic compound is at least one member selected from the group consisting of amidine and diamidine compounds of the formula

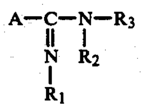

(I)

wherein:

$R_1$ and $R_2$ are the same or different and are each phenyl, naphthyl, phenyl-$C_1$–$C_4$ alkyl or naphthyl-$C_1$–$C_4$ alkyl, each unsubstituted or substituted with $C_1$–$C_4$ alkyl, $C_1$–$C_4$ alkoxy, phenyloxy, nitro or halogen, $R_3$ is hydrogen, $C_5$–$C_6$ cycloalkyl, phenyl, naphthyl, phenyl-$C_1$–$C_4$ alkyl, naphthyl-$C_1$–$C_4$ alkyl or $C_1$–$C_{18}$ alkyl, said phenyl, naphthyl, phenyl-$C_1$–$C_4$ alkyl and naphthyl-$C_1$–$C_4$ alkyl being unsubstituted or substituted with $C_1$–$C_4$ alkyl, $C_1$–$C_4$ alkoxy, phenyloxy, nitro or halogen and said $C_1$–$C_{18}$ alkyl being unsubstituted or substituted with $C_1$–$C_4$ alkoxy, phenyloxy or halogen, and A is $R_4$ or a group of the formula

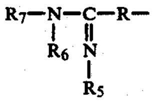

wherein:

$R_4$ is $C_5$–$C_6$ cycloalkyl, phenyl, naphthyl, phenyl-$C_1$–$C_4$ alkyl, naphthyl-$C_1$–$C_4$ alkyl or $C_1$–$C_{18}$ alkyl, said phenyl, naphthyl, phenyl-$C_1$–$C_4$ alkyl and naphthyl-$C_1$–$C_4$ alkyl being unsubstituted or substituted with $C_1$–$C_4$ alkyl, $C_1$–$C_4$ alkoxy, phenyloxy, nitro or halogen and said $C_1$–$C_{18}$ alkyl being unsubstituted or substituted with $C_1$–$C_4$ alkoxy, phenyloxy or halogen, $R_5$ and $R_6$ have the same meaning as $R_1$ or $R_2$, $R_7$ has the same meaning as $R_3$, and R is alkylene, phenylene, naphthylene or a group of the formula

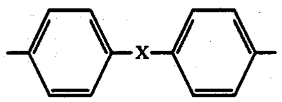

wherein X is alkylene, $SO_2$, S, O, NH or a single bond.

2. A heat-sensitive recording material as defined in claim 1 in which the heat-fusible basic compound is an amidine compound represented by the formula

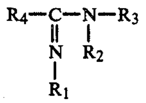
(Ia)

wherein $R_1$, $R_2$, $R_3$ and $R_4$ are as defined in claim 1.

3. A heat-sensitive recording material as defined in claim 2 in which $R_1$ and $R_2$ are each phenyl unsubstituted or substituted with $C_1$–$C_4$ alkyl, $C_1$–$C_4$ alkoxy, nitro or halogen, and $R_3$ is hydrogen and $R_4$ is phenyl, naphthyl, phenyl-$C_1$–$C_4$ alkyl, naphthyl-$C_1$–$C_4$ alkyl or $C_1$–$C_{18}$ alkyl, said phenyl, naphthyl, phenyl-$C_1$–$C_4$ alkyl and naphthyl-$C_1$–$C_4$ alkyl being unsubstituted or substituted with $C_1$–$C_4$ alkyl, $C_1$–$C_4$ alkoxy, nitro or halogen on the aromatic ring and said $C_1$–$C_{18}$ alkyl being unsubstituted or substituted with $C_1$–$C_4$ alkoxy, phenyloxy or halogen.

4. A heat-sensitive recording material as defined in claim 1 in which the heat-fusible compound is a diamidine compound represented by the formula

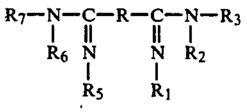
(Ib)

wherein $R_1$, $R_2$, $R_3$, $R_5$, $R_6$, $R_7$ and R are as defined in claim 1.

5. A heat-sensitive recording material as defined in claim 4 in which $R_1$, $R_2$, $R_5$ and $R_6$ are each phenyl unsubstituted or substituted with $C_1$–$C_4$ alkyl, $C_1$–$C_4$ alkoxy, nitro or halogen, $R_3$ and $R_7$ are each hydrogen and R is $C_1$–$C_{18}$ alkylene.

6. A heat-sensitive recording material as defined in claim 1 in which the heat-fusible basic compound is used in an amount of about 1 to about 30 parts by weight per part by weight of the diazonium salt.

7. A heat-sensitive recording material as defined in claim 1 in which the coupler is used in an amount of about 0.1 to about 10 parts by weight per part by weight of the diazonium salt.

8. A heat-sensitive recording material as defined in claim 1 in which the heat-sensitive recording layer contains a binder.

9. A heat-sensitive recording material as defined in claim 8 in which the binder is used in an amount of about 5 to about 30% by weight based on the total weight of the solids in the heat-sensitive recording layer.

* * * * *